US011555536B2

(12) United States Patent
Oshidari (10) Patent No.: US 11,555,536 B2
(45) Date of Patent: Jan. 17, 2023

(54) POWER TRANSMISSION DEVICE

(71) Applicant: JATCO LTD, Fuij (JP)

(72) Inventor: Toshikazu Oshidari, Kanagawa (JP)

(73) Assignee: Jateo Ltd, Fuji (JP)

( * ) Notice: Subject to any disclaimer, the term of this patent is extended or adjusted under 35 U.S.C. 154(b) by 0 days.

(21) Appl. No.: 17/428,531

(22) PCT Filed: Nov. 12, 2019

(86) PCT No.: PCT/JP2019/044221
§ 371 (c)(1),
(2) Date: Aug. 4, 2021

(87) PCT Pub. No.: WO2020/161978
PCT Pub. Date: Aug. 13, 2020

(65) Prior Publication Data
US 2022/0154809 A1 May 19, 2022

(30) Foreign Application Priority Data
Feb. 8, 2019 (JP) .............................. JP2019-022134

(51) Int. Cl.
*F16H 37/08* (2006.01)
*F16H 48/08* (2006.01)
(Continued)

(52) U.S. Cl.
CPC ........... *F16H 37/082* (2013.01); *F16H 48/08* (2013.01); *F16H 48/11* (2013.01);
(Continued)

(58) Field of Classification Search
CPC ........ F16H 37/082; F16H 48/08; F16H 48/11; F16H 2048/085; F16H 2048/106; H02K 7/116; B60K 2001/001
See application file for complete search history.

(56) References Cited

U.S. PATENT DOCUMENTS 6,401,850 B1 * 6/2002 Bowen ..................... B60K 6/26
903/910
8,049,384 B2 * 11/2011 Wilton ..................... B60K 1/00
310/83
(Continued)

FOREIGN PATENT DOCUMENTS

CN 106696670 A * 5/2017 ............... B60K 1/00
DE 102012009346 A1 * 11/2013 ............... B60K 1/00
(Continued)

*Primary Examiner* — Sherry L Estremsky
(74) *Attorney, Agent, or Firm* — Global IP Counselors, LLP (57) ABSTRACT

A power transmission device includes a motor, a first planetary reduction gear connected downstream of the motor, a second planetary reduction gear connected downstream of the first planetary reduction gear, a differential gear connected downstream of the second planetary reduction gear, a drive shaft connected downstream of the differential gear, and a case member. The drive shaft penetrates an inner circumference of a rotor of the motor, an inner circumference of a sun gear of the first planetary reduction gear, and an inner circumference of a sun gear of the second planetary reduction gear. A portion of the differential case positioned between the first planetary reduction gear and the second planetary reduction gear is supported at an inner circumference side of a portion of the case member with a first bearing being interposed.

14 Claims, 3 Drawing Sheets

(51) Int. Cl.
  *F16H 48/11* (2012.01)
  *F16H 48/10* (2012.01)
  *H02K 7/116* (2006.01)

(52) U.S. Cl.
  CPC .. *F16H 2048/085* (2013.01); *F16H 2048/106* (2013.01); *H02K 7/116* (2013.01)

(56) References Cited

U.S. PATENT DOCUMENTS

| | | | |
|---|---|---|---|
| 8,499,868 B2 * | 8/2013 | Fuechtner | B60K 1/00 180/65.7 |
| 10,247,294 B2 * | 4/2019 | Biermann | B60K 17/354 |
| 10,253,857 B2 * | 4/2019 | LaForce | B60K 17/16 |
| 10,746,278 B2 * | 8/2020 | Wakui | F16H 57/025 |
| 11,014,455 B2 * | 5/2021 | Suyama | B60L 15/007 |
| 2005/0143210 A1 | 6/2005 | Hamai et al. | |
| 2015/0013488 A1 | 1/2015 | Matsuoka et al. | |
| 2016/0123454 A1 | 5/2016 | Tahara et al. | |
| 2018/0180162 A1 | 6/2018 | Hakuta et al. | |
| 2020/0116236 A1 | 4/2020 | Biermann et al. | |
| 2020/0282828 A1 * | 9/2020 | Suyama | F16H 57/0456 |

FOREIGN PATENT DOCUMENTS

| | | | | |
|---|---|---|---|---|
| EP | 2511570 A1 * | 10/2012 | | F16H 3/54 |
| EP | 3 663 610 A1 | 6/2020 | | |
| JP | H05116549 A * | 5/1993 | | |
| JP | 2001-330111 A | 11/2001 | | |
| JP | 2005-125920 A | 5/2005 | | |
| JP | 2011-256969 A | 12/2011 | | |
| JP | 2013-221566 A | 10/2013 | | |
| JP | 2016-089860 A | 5/2016 | | |
| JP | 2018-103676 A | 7/2018 | | |
| JP | 2019-074207 A | 5/2019 | | |
| WO | 2018/188691 A1 | 10/2018 | | |

* cited by examiner

POWER TRANSMISSION DEVICE

CROSS-REFERENCE TO RELATED APPLICATIONS

This is a U.S. national phase application of PCT/JP2019/044221, filed on Nov. 12, 2019, which claims priority to Japanese Patent Application No. 2019-022134, filed on Feb. 8, 2019. The entire disclosure of Japanese Patent Application No. 2019-022134 is hereby incorporated herein by reference.

TECHNICAL FIELD

The present invention relates to a power transmission device.

BACKGROUND ART

In Japanese Laid-Open Patent Publication No. 2013-221566, Japanese Laid-Open Patent Publication No. 2016-89860, and Japanese Laid-Open Patent Publication No. 2018-103676 disclosed is a power transmission device.

The power transmission device of Japanese Laid-Open Patent Publication No. 2013-221566 has three rotation axes that are involved in rotation transmission aligned in parallel, and the size easily increases in the vertical direction (gravity direction) (hereafter called the "3-axis type").

In the power transmission device of Japanese Laid-Open Patent Publication No. 2016-89860, a rotor of a motor is a hollow shaft, and a drive shaft penetrates the interior of this hollow shaft. For that reason, compared to the 3-axis type, it is possible to reduce the size in the vertical direction, but due to placement of a large counter gear, it ends up increasing in size in the vertical direction (hereafter called the "2-axis type").

In the power transmission device of Japanese Laid-Open Patent Publication No. 2018-103676, rather than the counter gear, a planetary reduction gear having a stepped pinion is used, and compared to the 2-axis type, it is possible to reduce the size in the vertical direction (hereafter called the "1-axis type").

SUMMARY

With the 1-axis type, a planetary reduction gear is used, so there is a tendency for the reduction ratio to be smaller than with the 2-axis type and the 3-axis type.

For that reason, in the 1-axis type power transmission device, there is a demand to increase the reduction ratio, and also to increase the stability of support of the differential gear.

One embodiment of the present disclosure is directed to a power transmission device having: a motor, a first planetary reduction gear connected downstream of the motor, a second planetary reduction gear connected downstream of the first planetary reduction gear, a differential gear connected downstream of the second planetary reduction gear, and drive shafts connected downstream of the differential gear, wherein the drive shafts are arranged penetrating the inner circumference of a rotor of the motor, the inner circumference of a sun gear of the first planetary reduction gear, and the inner circumference of the sun gear of the second planetary reduction gear, the differential gear has a differential case, and a portion of the differential case positioned between the first planetary reduction gear and the second planetary reduction gear is supported at the inner circumference side of a case member with a bearing interposed.

The elements that rotate in the same way as the differential gear of the second planetary reduction gear and the differential case are integrated with high rigidity. For that reason, when a configuration is adopted in which the elements integrated with the differential gear of the second planetary reduction gear are supported by a case member that is a fixed side member with a bearing that is provided at the first planetary reduction gear side of the second planetary reduction gear interposed, it is possible to increase the reduction ratio, and to increase the stability of support of the differential gear.

DETAILED DESCRIPTION OF EMBODIMENTS

Following, embodiments of the present invention are explained.

Figure 1:
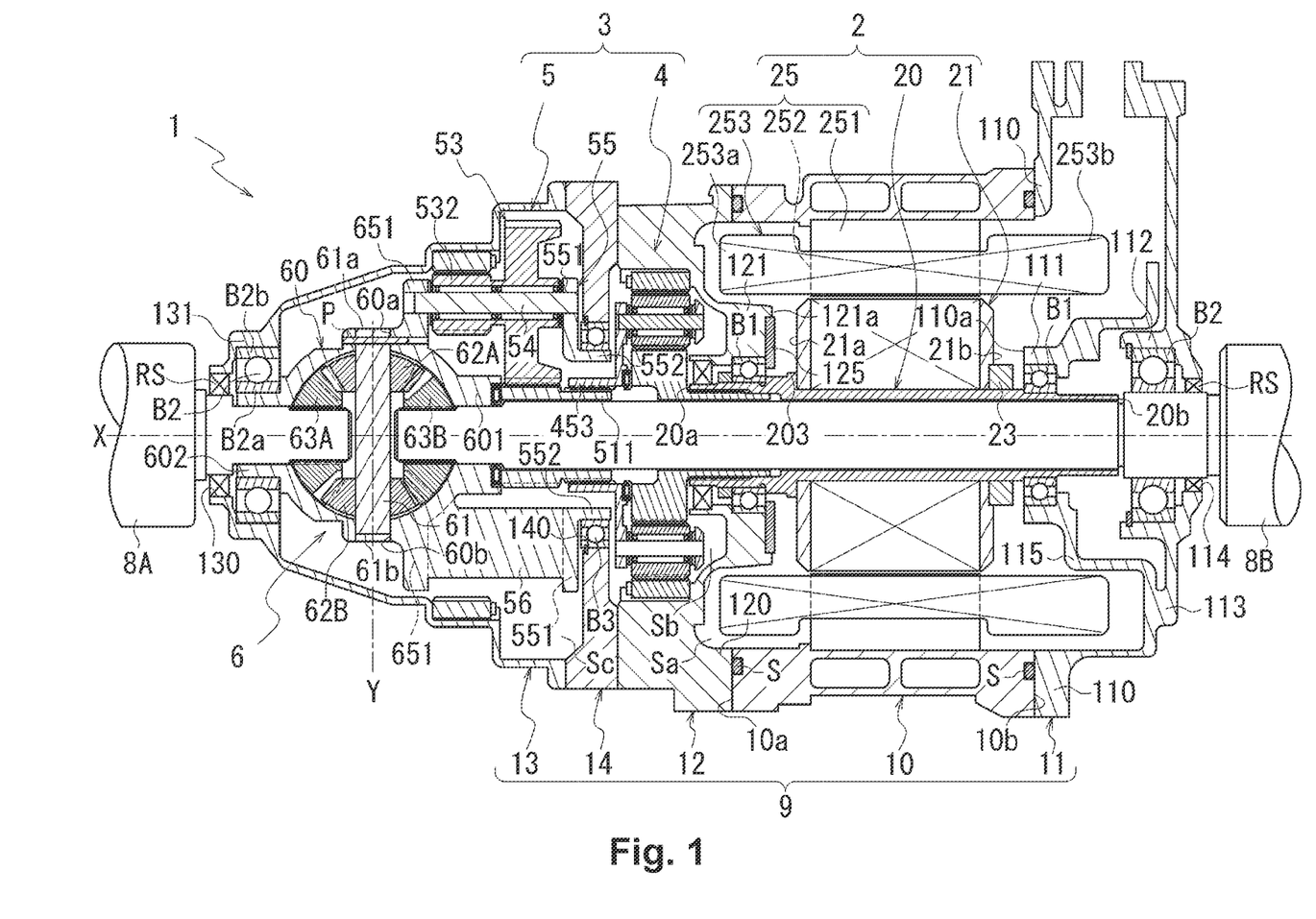
FIG. 1 is a drawing for explaining a power transmission device of the present embodiment.

FIG. 1 is a drawing for explaining a power transmission device 1 of the present embodiment.

Figure 2:
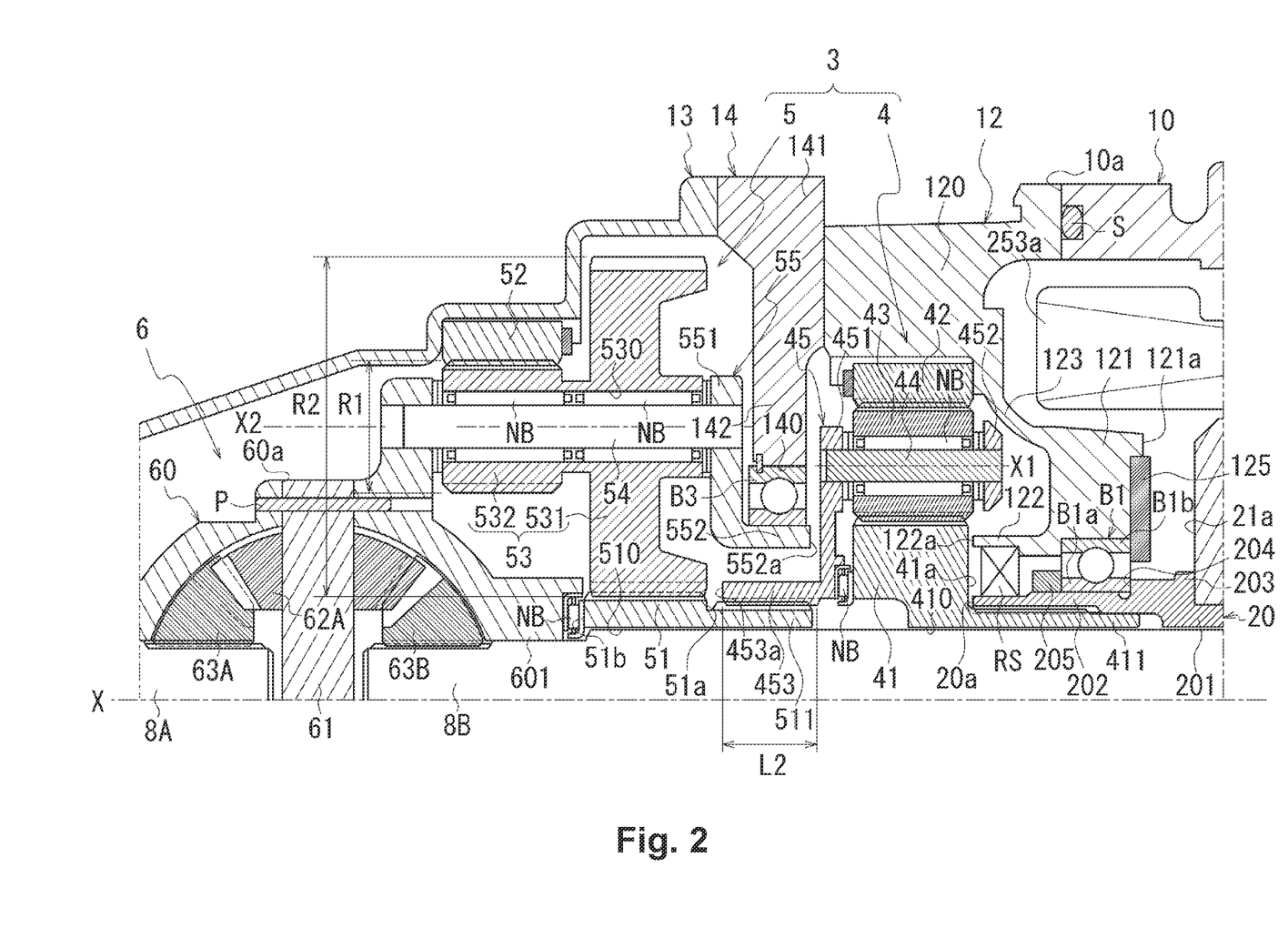
FIG. 2 is an enlarged view around a reduction mechanism of the power transmission device.

FIG. 2 is an enlarged view around a reduction mechanism 3 (first planetary reduction gear 4, second planetary reduction gear 5) of the power transmission device 1.

The power transmission device 1 has: a motor 2; the reduction mechanism 3 (first planetary reduction gear 4, second planetary reduction gear 5) that reduces output rotation of the motor 2 and inputs that to the differential device 6; and drive shafts 8 (8A, 8B).

With the power transmission device 1, the reduction mechanism 3 (first planetary reduction gear 4, second planetary reduction gear 5), the differential device 6, and the drive shafts 8 (8A, 8B) are provided along the transmission route of the output rotation of the motor 2.

The output rotation of the motor 2 is reduced by the reduction mechanism 3, and after being inputted to the differential device 6, is transmitted via the drive shafts 8 (8A, 8B) to drive wheels (not illustrated) at left and right of a vehicle in which the power transmission device 1 is mounted. In FIG. 1, the drive shaft 8A is connected so that rotation can be transmitted to the left wheel of the vehicle in which the power transmission device 1 is mounted, and the drive shaft 8B is connected to be able to transmit rotation to the right wheel.

Here, the first planetary reduction gear 4 is connected downstream of the motor 2, and the second planetary reduction gear 5 is connected downstream of the first planetary reduction gear 4. The differential device 6 is connected downstream of the second planetary reduction gear 5, and the drive shafts 8 (8A, 8B) are connected downstream of the differential device 6.

The motor 2 has: a cylindrical motor shaft 20; a cylindrical rotor core 21 externally fitted on the motor shaft 20; and a stator core 25 that surrounds the outer circumference of the rotor core 21 with a prescribed gap.

The motor shaft 20 is provided to be able to rotate relatively with respect to the drive shaft 8B in a state externally fitted on the drive shaft 8B.

With the motor shaft 20, bearings B1, B1 are externally fitted and fixed to the outer circumference of one end 20a side and another end 20b side in the longitudinal direction.

The one end 20a side of the motor shaft 20 is supported to be able to rotate by a cylindrical motor support unit 121 of an intermediate case 12 with the bearing B1 interposed.

The other end 20b side of the motor shaft 20 is supported to be able to rotate by a cylindrical motor support unit 111 of a cover 11 with the bearing B1 interposed.

The motor 2 has a motor housing 10 that surrounds the outer circumference of the rotor core 21 with a prescribed gap. With the present embodiment, the intermediate case 12 is joined to one end 10a of the motor housing 10, and the cover 11 is joined to the other end 10b of the motor housing 10.

Seal rings S, S are provided on the one end 10a and the other end 10b of the motor housing 10. The one end 10a of the motor housing 10 is joined without a gap to a ring-shaped base 120 of the intermediate case 12 by the seal ring S provided on that one end 10a.

The other end 10b of the motor housing 10 is joined without a gap to a ring-shaped junction part 110 of the cover 11 by the seal ring S provided on that other end 10b.

With the intermediate case 12, the base 120 and the motor support unit 121 are provided with the positions displaced in the rotation axis X direction.

With the present embodiment, when the intermediate case 12 is fixed to the one end 10a of the motor housing 10, the motor support unit 121 is made to be inserted inside the motor housing 10.

In this state, the motor support unit 121 is arranged facing a one end part 21a of the rotor core 21 with a gap being formed in the rotation axis X direction at the inner diameter side of a coil end 253a noted later (see FIG. 2).

Also, as shown in FIG. 2, a connecting part 123 that connects the base 120 and the motor support unit 121 is provided avoiding contact with the coil end 253a and a side plate 452 described later.

A bearing retainer 125 is fixed to an end surface 121a of the rotor core 21 side of the motor support unit 121.

The bearing retainer 125 has a ring shape when seen from the rotation axis X direction. The inner diameter side of the bearing retainer 125 abuts the side surface of an outer race B1b of the bearing B1 supported by the motor support unit 121 from the rotation axis X direction. The hearing retainer 125 prevents falling off of the bearing B1 from the motor support unit 121.

As shown in FIG. 1, with the cover 11, the junction part 110 and the motor support unit 111 are provided with the positions displaced in the rotation axis X direction.

With the present embodiment, when the junction part 110 of the cover 11 is fixed to the other end 10b of the motor housing 10, the motor support unit 111 is made to be inserted inside the motor housing 10.

In this state, the motor support unit 111 is arranged facing an other end part 21b of the rotor core 21 with a gap being formed in the rotation axis X direction at the inner diameter side of a coil end 253b described later.

A connecting part 115 that connects the junction part 110 and a side wall part 113 of the cover 11 is provided while avoiding contact with the coil end 253b and a support cylinder 112 described later.

Inside the motor housing 10, the rotor core 21 is arranged between the motor support unit 111 of the cover 11 side, and the motor support unit 121 of the intermediate case 12 side.

The rotor core 21 is formed by laminating a plurality of silicon steel sheets, and each of the silicon steel sheets is externally fitted on the motor shaft 20 in a state where relative rotation with the motor shaft 20 is regulated.

Seen from the rotation axis X direction of the motor shaft 20, the silicon steel sheet has a ring shape, and at the outer peripheral side of the silicon steel sheet, N pole and S pole magnets (not illustrated) are provided alternately in the circumferential direction around the rotation axis X.

The one end part 21a of the rotor core 21 in the rotation axis X direction is positioned using a large diameter part 203 of the motor shaft 20. The other end part 21b of the rotor core 21 is positioned using a stopper 23 press fitted in the motor shaft 20.

The stator core 25 is formed by laminating a plurality of electromagnetic steel sheets, and each of the electromagnetic steel sheets has a ring-shaped yoke part 251 fixed to the inner circumference of the motor housing 10, and a teeth part 252 projecting to the rotor core 21 side from the inner circumference of the yoke part 251.

With the present embodiment, the stator core 25 having a configuration in which a winding 253 is distributed and wound across a plurality of teeth parts 252 is adopted, and the stator core 25 has a longer length in the rotation axis direction than the rotor core 21 by the amount of the coil ends 253a, 253b projecting in the rotation axis X direction.

It is also possible to adopt the stator core of a configuration in which the windings are concentrically wound on each of the plurality of teeth parts 252 projecting to the rotor core 21 side.

With the motor shaft 20, the bearing B1 is press-fitted further to the outer circumference of the area of the one end 20a side than the large diameter part 203.

As shown in FIG. 2, with an inner race B1a of the bearing B1, one side surface of the rotation axis X direction abuts a step part 204 provided on the outer circumference of the motor shaft 20. With the inner race B1a, a ring-shaped stopper 205 that is press-fitted in the outer circumference of the motor shaft 20 abuts the other side surface.

With the bearing B1, the inner race B1a is positioned by the stopper 205 at a position abutting the step part 204.

The one end 20a of the motor shaft 20 is positioned more to the differential device 6 side (left side in the drawing) than the stopper 205. In the rotation axis X direction, the one end 20a faces a side surface 41a of a sun gear 41 of the first planetary reduction gear 4 with a gap being formed therebetween.

At the one end 20a side of the motor shaft 20, a cylinder wall 122 is positioned radially outward of the motor shaft 20.

The cylinder wall 122 projects to the differential device 6 side from the motor support unit 121, and a tip 122a of the cylinder wall 122 faces the side surface 41a of the sun gear 41 of the first planetary reduction gear 4 with a gap being formed therebetween.

The cylinder wall 122 surrounds the outer circumference of the motor shaft 20 with a prescribed gap, and a lip seal RS is arranged between the cylinder wall 122 and the motor shaft 20.

The lip seal RS is provided to partition a space Sa (see FIG. 1) of the inner diameter side of the motor housing 10 and a space Sb (see FIG. 1) of the inner diameter side of the intermediate case 12.

The space Sb of the inner diameter side of the intermediate case 12 is linked with a space Sc inside a case 13 that houses the differential device 6 described later. Lubricating oil of the differential device 6 is sealed within the space Sb.

The lip seal RS is provided to block inflow of lubricating oil to the space Sa of the inner diameter side of the motor housing 10.

With the present embodiment, a body case 9 of the power transmission device 1 is constituted by the motor housing 10, the cover 11, the intermediate case 12, the case 13, and an intermediate cover 14 described later.

The internal space of the body case 9 uses the intermediate case 12 as a boundary, and the space Sa of the motor housing 10 side serves as a motor chamber that houses the motor 2. Spaces Sb, Sc of the case 13 side serve as gear chambers that house the reduction mechanism 3 (first planetary reduction gear 4, second planetary reduction gear 5).

Also, the gear chambers are partitioned by the intermediate cover 14 described later into the space Sb that houses the first planetary reduction gear 4, and the space Sc that houses the second planetary reduction gear 5 and the differential case 60.

As shown in FIG. 2, an area 202 of the one end 20a side of the motor shaft 20 is formed with a larger inner diameter than an area 201 on which the rotor core 21 is externally fitted.

A cylindrical linking part 411 of the sun gear 41 is inserted inside the area 202 of this one end 20a side. In this state, the area 202 of the one end 20a side of the motor shaft 20 and the linking part 411 of the sun gear 41 are spline fitted without being able to rotate relatively.

For this reason, the output rotation of the motor 2 is inputted to the sun gear 41 of the first planetary reduction gear 4 via the motor shaft 20, and the sun gear 41 rotates around the rotation axis X by the rotational drive power of the motor 2.

The sun gear 41 has the linking part 411 extending in the rotation axis X direction from the side surface 41a of the inner diameter side. The linking part 411 is formed integrally with the sun gear 41, and a through hole 410 is formed straddling the inner diameter side of the sun gear 41 and the inner diameter side of the linking part 411.

The sun gear 41 is supported to be able to rotate on the outer circumference of the drive shaft 8B penetrating the through hole 410.

A ring gear 42 fixed to the inner circumference of the base 120 of the intermediate case 12 is positioned at the outer diameter side of the sun gear 41 in the radial direction of the rotation axis X. In the radial direction of the rotation axis X, between the sun gear 41 and the ring gear 42, a pinion gear 43 that is supported to be able to rotate on a pinion shaft 44 is engaged with the outer circumference of the sun gear 41 and the inner circumference of the ring gear 42.

The pinion gear 43 is supported to be able to rotate at the outer circumference of the pinion shaft 44 via a needle bearing NB. The pinion shaft 44 penetrates the pinion gear 43 in the axis line X1 direction along the rotation axis X. One end and the other end of the longitudinal direction of the pinion shaft 44 is supported by a pair of side plates 451, 452 of a carrier 45.

The side plates 451, 452 are provided in parallel with each other with a gap being formed in the rotation axis X direction.

Between the side plates 451, 452, the plurality of pinion gears 43 are provided in a plurality (four, for example) at a prescribed interval in the circumferential direction around the rotation axis X.

A cylindrical linking part 453 is provided on the side plate 451 positioned at the differential device 6 side.

The linking part 453 in the side plate 451 is arranged concentrically with respect to the rotation axis X, and projects in the direction approaching the differential device 6 (leftward in the drawing) along the rotation axis X.

Viewed from the intermediate case 12, the ring shaped intermediate cover 14 is positioned at the differential device 6 side. With the intermediate cover 14, a ring shaped base 141 of the outer diameter side is provided in a state sandwiched between the intermediate case 12 and the case 13.

With the present embodiment, the intermediate cover 14 is positioned between the first planetary reduction gear 4 and the second planetary reduction gear 5 aligned in the rotation axis X direction.

The intermediate cover 14 has a wall part 142 extending to the inner diameter side from the ring shaped base 141. The wall part 142 is provided oriented orthogonally to the rotation axis X. The inner diameter side of the wall part 142 is inserted from the radial direction of the rotation axis X between the first planetary reduction gear 4 and the second planetary reduction gear 5 aligned in the rotation axis X direction.

At the inner diameter side of the wall part 142, an opening 140 is provided penetrating the wall part 142 in the thickness direction (rotation axis X direction).

The outer circumference of the opening 140 is provided at a position intersecting the axis line X1 that passes through the center of the pinion shaft 44 of the first planetary reduction gear 4.

The linking part 453 provided on the inner diameter side of the side plate 451 of the first planetary reduction gear 4 penetrates the opening 140 at the center of the intermediate cover 14 (wall part 142) to the left of the differential device 6 side from the motor 2 side.

The tip 453a of the linking part 453 is positioned inside the case 13 attached to the intermediate cover 14. The tip 453a of the linking part 453 in the rotation axis X direction faces a side surface 51a of a sun gear 51 of the second planetary reduction gear 5 with a gap being formed.

A cylindrical linking part 511 extending from the sun gear 51 is inserted inside the linking part 453 and spline fitted, and the linking part 453 of the first planetary reduction gear 4 side and the linking part 511 of the second planetary reduction gear 5 side are linked without being able to rotate relatively at the inner diameter side of the intermediate cover 14.

The sun gear 51 has the linking part 511 extending in the rotation axis X direction from the side surface 51a of the inner diameter side. The linking part 511 is formed integrally with the sun gear 51, and a through hole 510 is formed straddling the inner diameter side of the sun gear 51 and the inner diameter side of the linking part 511.

The sun gear 51 is supported to be able to rotate on the outer circumference of the drive shaft 8B penetrating the through hole 510.

A side surface 51b of the differential device 6 side of the sun gear 51 faces a cylindrical support unit 601 of the differential case 60 described later with a gap being formed in the rotation axis X direction, and the needle bearing NB is interposed between the side surface 51b and the support unit 601.

The sun gear 51 engages with a large diameter gear part 531 of a stepped pinion gear 53 on an extension of the abovementioned linking part 542 of the first planetary reduction gear 4 side.

The stepped pinion gear 53 has the large diameter gear part 531 that engages with the sun gear 51, and a small diameter gear part 532 having a smaller diameter than the large diameter gear part 531.

The stepped pinion gear 53 is a gear component in which the large diameter gear part 531 and the small diameter gear part 532 are provided integrally, aligned in an axis line X2 direction that is parallel to the rotation axis X.

The stepped pinion gear 53 has a through hole 530 penetrating the inner diameter side of the large diameter gear part 531 and the small diameter gear part 532 in the axis line X2 direction.

The stepped pinion gear 53 is supported to be able to rotate on the outer circumference of a pinion shaft 54 penetrating the through hole 530 with the needle bearing NB interposed.

One end and the other end in the longitudinal direction of the pinion shaft 54 are supported by a side plate 651 integrally formed with the differential case 60, and a side plate 551 arranged with a gap being formed on this side plate 651.

The side plates 651, 551 are provided in parallel with each other with a gap being formed in the rotation axis X direction.

Between the side plates 651, 551, the plurality of stepped pinion gears 53 are provided in a plurality (three, for example) at a prescribed interval in the circumferential direction around the rotation axis X.

Each of the small diameter gear parts 532 is engaged with the inner circumference of the ring gear 52. The ring gear 52 is spline fitted with the inner circumference of the case 13, and relative rotation of the ring gear 52 with the case 13 is regulated.

At the inner diameter side of the side plate 551, a cylindrical part 552 is provided extending to the first planetary reduction gear 4 side. The cylindrical part 552 penetrates the opening 140 at the center of the intermediate cover 14 (wall part 142) at the motor 2 side (right side in the drawing) from the differential device 6 side. A tip 552a of the cylindrical part 552 faces the side plate 451 of the carrier 45 of the first planetary reduction gear 4 in the rotation axis X direction with a gap being formed.

The cylindrical part 552 is positioned radially outward of the engaging part between the linking part 453 of the first planetary reduction gear 4 side, and the linking part 511 of the second planetary reduction gear 5 side. A bearing B3 fixed to the opening 140 of the intermediate cover 14 (wall part 142) is in contact with the outer circumference of the cylindrical part 552. The cylindrical part 552 of the side plate 551 is supported to be able to rotate on the intermediate cover 14 with the bearing B3 interposed.

With the second planetary reduction gear 5, one side plate 651 of the side plate 551 and the side plate 651 constituting the carrier 55 is formed integrally with the differential case 60 of the differential device 6.

For that reason, the carrier 55 (side plates 551, 651, pinion shaft 54) of the second planetary reduction gear 5 is substantially formed integrally with the differential case 60.

With the second planetary reduction gear 5, the output rotation of the motor 2 reduced by the first planetary reduction gear 4 is inputted to the sun gear 51.

The output rotation inputted to the sun gear 51 is inputted to the stepped pinion gears 53 via the large diameter gear part 531 that engages with the sun gear 51, and the stepped pinion gear 53 rotates around the axis line X2.

Having done that, the small diameter gear part 532 that is integrally formed with the large diameter gear part 531 rotates around the axis line X2 integrally with the large diameter gear part 531.

Here, the small diameter gear part 532 engages with the ring gear 52 fixed to the inner circumference of the case 13.

For that reason, when the small diameter gear part 532 rotates around the axis line X2, the stepped pinion gear 53 rotates around the rotation axis X while auto-rotating around the axis line X2.

Having done that, the one end of the pinion shaft 54 is supported on the side plate 651 that is integrally formed with the differential case 60, so in conjunction with the displacement of the stepped pinion gear 53 in the circumferential direction around the rotation axis X, the differential case 60 rotates around the rotation axis X.

Here, with the stepped pinion gear 53, an outer diameter R1 of the small diameter gear part 532 is smaller than an outer diameter R2 of the large diameter gear part 531 (see FIG. 2).

Also, with the second planetary reduction gear 5, the sun gear 51 serves as the input unit of the output rotation of the motor 2, and the carrier 55 that supports the stepped pinion gear 53 serves as the output unit of the inputted rotation.

Having done that, the rotation inputted to the sun gear 51 of the second planetary reduction gear 5, after being significantly reduced by the stepped pinion gear 53, is outputted to the differential case 60 with which the side plate 651 of the carrier 55 is integrally formed.

As shown in FIG. 1, the differential case 60 is formed to have a hollow shape that internally houses a shaft 61, bevel gears 62A, 62B, and side gears 63A, 63B.

With the differential case 60, cylindrical support units 601, 602 are provided at both sides in the rotation axis X direction (lateral direction in the drawing). The support units 601, 602 extend along the rotation axis X in the direction away from the shaft 61.

As shown in FIG. 1, a connector piece 56 that connects the side plate 651 and the side plate 551 of the carrier 55 is provided at the outer diameter side of the support unit 601.

One end of the differential case 60 side of the connector piece 56 is provided straddling the side plate 651 and the outer circumference of the differential case 60, and the other end is connected to the side plate 551 from the rotation axis X direction.

The connector piece 56 is provided at a position avoiding interference with the stepped pinion gear 53 noted above. As described above, the stepped pinion gear 53 is provided in a plurality (three, for example) at a prescribed interval in the circumferential direction around the rotation axis X.

The connector pieces 56 are provided between adjacent stepped pinion gears 53 in the circumferential direction around the rotation axis X.

An inner race B2a of a bearing B2 (one example of a second bearing) is press fitted on the outer circumference of the support unit 602 of the differential case 60. An outer race B2b of the bearing B2 is held by a ring-shaped support unit 131 of the case 13, and the support unit 602 of the differential case 60 is supported to be able to rotate by the case 13 with the bearing B2 interposed.

The drive shaft 8A that penetrates an opening 130 of the case 13 is inserted from the rotation axis X direction in the support unit 602, and the drive shaft 8A is supported to be able to rotate by the support unit 602.

The lip seal RS is fixed to the inner circumference of the opening 130, and by a lip section (not illustrated) of the lip seal RS being elastically in contact with the outer circumference of the drive shaft 8A, the gap between the outer circumference of the drive shaft 8A and the inner circumference of the opening 130 is sealed.

The drive shaft 8B that penetrates an opening 114 of the cover 11 is inserted in the support unit 601 from the rotation axis direction.

The drive shaft 8B is provided crossing the motor shaft 20 of the motor 2, the sun gear 41 of the first planetary reduction gear 4, and the inner diameter side of the sun gear 51 of the second planetary reduction gear 5 in the rotation axis X direction, and the tip end side of the drive shaft 8B is supported to be able to rotate by the support unit 601.

The lip seal RS is fixed to the inner circumference of the opening 114 of the cover 11, and the gap between the outer circumference of the drive shaft 8B and the inner circumference of the opening 114 is sealed by the lip part (not illustrated) of the lip seal RS being elastically in contact with the outer circumference of the drive shaft 8B.

In the interior of the differential case 60, side gears 63A, 63B are spline fitted at the outer circumference of the tip end part of the drive shafts 8A, 8B, and the side gears 63A, 63B and drive shafts 8 (8A, 8B) are linked to be able to rotate integrally around the rotation axis X.

Shaft holes 60a, 60b penetrating the differential case 60 in the direction orthogonal to the rotation axis X are provided at symmetrical positions sandwiching the rotation axis X.

The shaft holes 60a, 60b are positioned on the axis line Y that is orthogonal to the rotation axis X, and one end 61a side and another end 61b side of the shaft 61 are inserted.

The one end 61a side and the other end 61b side of the shaft 61 are fixed to the differential case 60 by a pin P, and the shaft 61 is prohibited from auto-rotating around the axis line Y.

The bottom side of the differential case 60 is immersed in the lubricating oil inside the case 13.

With the embodiment, when the one end 61a or the other end 61b of the shaft 61 is positioned at the bottommost side, the lubricating oil is pooled inside the case 13 at least to a height at which the one end 61a or the other end 61b of the shaft 61 is positioned within the lubricating oil.

The shaft 61 is arranged along the axis line Y positioned between the side gears 63A, 63B inside the differential case 60.

The bevel gears 62A, 62B are externally fitted on the shaft 61 inside the differential case 60 and supported to be able to rotate.

Two bevel gears 62A, 62B are provided with a gap being formed in the longitudinal direction of the shaft 61 (axial direction of the axis line Y), and the bevel gears 62A, 62B are arranged in a state so that their teeth face each other. In the shaft 61, the bevel gears 62A, 62B are provided with the shaft center of the bevel gears 62A, 62B matched to the shaft center of the shaft 61.

Inside the differential case 60, the side gears 63A, 63B are positioned at both sides of the bevel gears 62A, 62B in the axial direction of the rotation axis X.

Two side gears 63A, 63B are provided with a gap being formed in the axial direction of the rotation axis X in a state so that their teeth face each other, and the bevel gears 62A, 62B and the side gears 63A, 63B are assembled in a state with the teeth mutually engaged.

As described above, with the power transmission device 1, the differential case 60 rotates around the rotation axis X by rotation input via the reduction mechanism 3 (first planetary reduction gear 4, second planetary reduction gear 5).

Here, with the differential case 60, of the support units 601, 602 provided at both sides of the rotation axis X direction, only the one support unit 602 is supported by the case 13 with the bearing B2 interposed.

As shown in FIG. 1, with the power transmission device 1, the second planetary reduction gear 5 (small diameter gear part 532 of the stepped pinion gear 53) is positioned at the outer diameter side of the other support unit 601. For that reason, the specification is that it is not possible to provide a member for supporting the differential case 60 at the outer diameter side of the support unit 602.

For that reason, the specification is that the support unit 601 side of the differential case 60 is indirectly supported by the cover 11 by the drive shaft 8B that penetrates the support unit 601 being supported by the cover 11 via the bearing B1.

As described above, with the present embodiment, the carrier 55 of the second planetary reduction gear 5 positioned at the outer diameter side of the support unit 601 is integrally formed with the differential case 60.

For that reason, the carrier 55 and the differential case 60 are provided integrally having a prescribed rigidity and strength.

Furthermore, the intermediate cover 14 that extends to the inner diameter side (rotation axis X side) is provided between the first planetary reduction gear 4 and the second planetary reduction gear 5, and at the inner diameter side of the other side plate 551 of the pair of side plates 551, 651 constituting the carrier 55, the cylindrical part 552 that crosses the opening 140 of the intermediate cover 14 (the wall part 142) in the rotation axis X direction is provided.

Also, a bearing B3 (one example of a first bearing) fixed to the inner circumference of the opening 140 of the intermediate cover 14 (wall part 142) is in contact with the outer circumference of the cylindrical part 552, and the cylindrical part 552 that extends from the side plate 551 of the carrier 55 is supported to be able to rotate on the intermediate cover 14 with the bearing B3 interposed.

With the present embodiment, the carrier 55 is substantially integrally formed with the differential case 60. For that reason, the cylindrical part 552 of the carrier 55 can be thought of as a portion of the differential case 60.

Thus, between the first planetary reduction gear 4 and the second planetary reduction gear 5, the cylindrical part 552 which is a portion of the differential case 60 is supported on the inner circumference of the wall part 142 of the intermediate cover 14 which is a fixed side member, with the bearing B3 interposed.

In this way, with the support unit 601 side (right side in FIG. 1) of the differential case 60, the cylindrical part 552 of the carrier 55 provided integrally with the differential case 60 is supported by the wall part 142 of the intermediate cover 14 with the bearing B3 interposed. The specification is that by doing this, the differential case 60 is supported indirectly by the intermediate cover 14 via the carrier 55 that is integrally formed with that differential case 60.

Here, the support position by the intermediate cover 14 is closer to the differential case 60 than the support position by the cover 11. For that reason, by providing the intermediate cover 14 and having the differential case 60 indirectly supported by the intermediate cover 14, the support stability of the differential case 60 rotating around the rotation axis X is increased more than when indirectly supported only by the cover 11.

The action of the power transmission device 1 of this configuration is explained.

With the power transmission device 1, the reduction mechanism 3 (first planetary reduction gear 4, second planetary reduction gear 5), the differential device 6, and the drive shafts 8 (8A, 8B) are provided along the transmission route of the output rotation of the motor 2.

When the rotor core 21 rotates around the rotation axis X by the driving of the motor 2, the rotation is inputted to the sun gear 41 of the first planetary reduction gear 4 via the motor shaft 20 that rotates integrally with the rotor core 21.

With the first planetary reduction gear 4, the sun gear 41 serves as the input unit of the output rotation of the motor 2, and the carrier 45 that supports the pinion gear 43 serves as the output unit of the inputted rotation.

When the sun gear 41 rotates around the rotation axis X by the output rotation of the motor 2, the pinion gear 43 engaged with the outer circumference of the sun gear 41 and the inner circumference of the ring gear 42 rotates around the axis line X1.

Here, the ring gear 42 is spline fitted to the inner circumference of the intermediate case 12 (fixed side member), and relative rotation with the intermediate case 12 is regulated.

For that reason, the pinion gear 43 revolves around the rotation axis X while rotating around the axis line X1. By doing this, the carrier 45 (side plates 451, 452) that supports the pinion gear 43 rotates around the rotation axis X at a rotation speed lower than the output rotation of the motor 2.

As described above, the linking part 453 of the carrier 45 is linked to the linking part 511 of the sun gear 51 of the second planetary reduction gear 5 side, and the rotation of the carrier 45 (output rotation of the first planetary reduction gear 4) is inputted to the sun gear 51 of the second planetary reduction gear 5.

With the second planetary reduction gear 5, the sun gear 51 serves as the input unit of the output rotation of the second planetary reduction gear 5, and the carrier 55 that supports the stepped pinion gear 53 serves as the output unit of the inputted rotation.

When the sun gear 51 rotates around the rotation axis X by the inputted rotation, the stepped pinion gear 53 (large diameter gear part 531, small diameter gear part 532) rotates around the axis line X2 by the rotation inputted from the sun gear 51 side.

Here, the small diameter gear part 532 of the stepped pinion gear 53 is engaged with the ring gear 52 fixed to the inner circumference of the case 13. For that reason, the stepped pinion gear 53 rotates around the rotation axis X while auto-rotating around the axis line X2.

By doing this, the carrier 55 (side plates 551, 651) that supports the stepped pinion gear 53 rotates around the rotation axis X at a rotation speed lower than the rotation inputted from the first planetary reduction gear 4 side.

Here, with the stepped pinion gear 53, the outer diameter R1 of the small diameter gear part 532 is smaller than the outer diameter R2 of the large diameter gear part 531 (see FIG. 2).

For that reason, the rotation inputted to the sun gear 51 of the second planetary reduction gear 5 is more greatly reduced by the stepped pinion gear 53 than with the first planetary reduction gear 4, after which it is outputted to the differential case 60 (differential device 6) with which the side plate 651 of the carrier 55 is integrally formed.

By the differential case 60 rotating around the rotation axis X by the inputted rotation, the drive shafts 8 (8A, 8B) rotate around the rotation axis X, with transmission to the left and right drive wheels (not illustrated) of the vehicle in which the power transmission device 1 is mounted.

With the differential case 60, of the support units 601, 602 provided at both sides in the rotation axis X direction, the one support unit 602 is supported by the case 13 via the bearing B2.

With the other support unit 601, though not supported by a fixed side member, the cylindrical part 552 of the carrier 55 provided integrally with the differential case 60 is supported by the intermediate cover 14 via the bearing B3, and the differential case 60 is indirectly supported by the intermediate cover 14 via the bearing B3.

The support positions by these bearings B2, B3 are positioned at both sides sandwiching the position at which the rotation of the differential case 60 is inputted from the second planetary reduction gear 5 (engagement position of the side plate 651 and the pinion shaft 54).

Thus, the support stability of the differential case 60 rotating around the rotation axis X by the inputted rotation is increased, and the stability of the differential device 6 (differential gear) is increased.

In this way, the first planetary reduction gear 4 and the second planetary reduction gear 5 that constitute the reduction mechanism 3 are arranged in series on the transmission route of the output rotation of the motor 2, and one pinion gear of the second planetary reduction gear 5 is used as the stepped pinion gear 53.

This makes it possible to make the reduction ratio greater in the reduction mechanism 3 than when planetary reduction gears having a normal pinion gear (stepless pinion gear) are simply arranged in series in the 1-axis type power transmission device.

Furthermore, the configuration is such that the intermediate cover 14 is provided between the first planetary reduction gear 4 and the second planetary reduction gear 5, and the cylindrical part 552 of the carrier 55 provided integrally with the differential case 60 is supported by the intermediate cover via the bearing B3.

By doing this, the one side (support unit 602) in the rotation axis X direction of the differential case 60 is supported by the case 13, and the other side (support unit 601 side) is indirectly supported by the intermediate cover 14, so the support stability of the differential case 60 that rotates around the rotation axis X is increased.

By the support stability of the differential case 60 being increased, the stability of the differential device 6 (differential gear) is also increased.

As described above, the power transmission device 1 of the present embodiment has the following configuration.

(1) The power transmission device 1 has:

the motor 2, the first planetary reduction gear 4 connected downstream of the motor 2, the second planetary reduction gear 5 connected downstream of the first planetary reduction gear 4, the differential device 6 (differential gear) connected downstream of the second planetary reduction gear 5, and drive shafts 8 (8A, 8B) connected downstream of the differential gear.

The drive shaft 8B is arranged penetrating the inner diameter side of the rotor core 21 of the motor 2 (inner circumference of the rotor), the inner diameter side (inner circumference) of the sun gear 41 of the first planetary reduction gear 4, and the inner diameter side (inner circumference) of the sun gear 51 of the second planetary reduction gear 5.

The differential device 6 has the differential case 60 (differential case).

The cylindrical part 552 that is a portion of the differential case 60, and is positioned between the first planetary reduction gear 4 and the second planetary reduction gear 5 aligned in the rotation axis X direction is supported at the inner circumference side of the intermediate cover 14 (a portion of a case member) via the bearing B3 (bearing).

By configuring in this way, the first planetary reduction gear 4 and the second planetary reduction gear 5 are arranged in series on the transmission route of the output rotation of the motor 2, and by having the planetary reduction gear be two levels, it is possible to increase the reduction ratio.

Here, in the power transmission device 1 having two levels of planetary reduction gears (first planetary reduction gear 4, second planetary reduction gear 5), if aiming only for a decrease in size in the rotation axis X direction, it is preferable to shorten the clearance in the rotation axis X direction between the first planetary reduction gear 4 and the second planetary reduction gear 5.

In such a case, the state is such that the differential case 60 arranged downstream of the second planetary reduction gear 5 is floating, and the stability of the differential case 60 is decreased.

In light of that, with the present invention, to give stability of the differential device 6 priority, the cylindrical part 552 that is a portion of the differential case 60, and is positioned between the two levels of planetary reduction gears (first planetary reduction gear 4, second planetary reduction gear 5) is supported by the intermediate cover 14 via the bearing B3.

This makes it possible for the differential device 6 (differential case 60) to rotate stably.

The power transmission device 1 of the present embodiment has the following configuration.

(2) The elements that rotate in the same way as the differential device 6 (differential gear) in the second planetary reduction gear 5 (carrier 55: including cylindrical part 552), and the differential case 60 (differential case) are integrated with high rigidity.

The elements integrated with the differential case 60 in the second planetary reduction gear 5 (carrier 55, cylindrical part 552) are supported by the intermediate cover 14 that is a fixed side member, with the bearing B3 provided on the first planetary reduction gear 4 side interposed.

By configuring in this way, the support stability when the differential case 60 rotates around the rotation axis X is improved, so it is possible for the differential device 6 to rotate stably.

The power transmission device 1 of the present embodiment has the following configuration.

(3) With the second planetary reduction gear 5, the sun gear 51 is an input element, the carrier 55 is an output element, and the ring gear 52 is a fixed element.

The differential case 60 is formed integrally with the carrier 55.

The cylindrical part 552 of the carrier 55 is supported to be able to rotate with the intermediate cover 14 via the bearing B3.

When the differential case 60 is formed integrally with the carrier 55, as a result of the rigidity of both the differential case 60 and the carrier 55 increasing, the stability of the differential case 60 increases.

Furthermore, because the differential case 60 and the carrier 55 are formed integrally, the differential case 60 being supported by the intermediate cover 14 (wall part) has the same meaning as the carrier 55 being supported by the intermediate cover 14 (wall part), so the carrier 55 can also rotate stably.

The power transmission device 1 of the present embodiment has the following configuration.

(4) The differential case 60 positioned at the side opposite to the second planetary reduction gear 5 is supported via the bearing B2 (bearing) by the case 13 (a portion of a case member) that houses the differential case 60.

By being configured in this way, there is a double holding configuration in which the differential case 60 is supported at both sides via two bearings B2, B3 (second bearing, first bearing), and with the double holding configuration, the stability of the differential device 6 increases.

The power transmission device 1 of the present embodiment has the following configuration.

(5) At the position of the inner circumference side of the bearing B3 fixed to the inner circumference of the intermediate cover 14 (wall part), the linking part 453 (output element) of the first planetary reduction gear 4 side, and the linking part 511 (input element) of the second planetary reduction gear 5 are engaged without being able to rotate relatively.

When the linking part 453 (output element) of the first planetary reduction gear 4 side, and the linking part 511 (input element) of the second planetary reduction gear 5 side are engaged (spline fitted, etc.), space is needed for engaging.

By using the space of the inner circumference side of the intermediate cover 14 as the space for engaging of the output element and the input element, it is possible to reduce the size of the power transmission device 1.

Said another way, in the radial direction of the rotation axis X (viewed from the radial direction), the intermediate cover 14, the bearing B2 (bearing), the differential case 60, the linking part 453 (output element) of the first planetary reduction gear 4, and the linking part 511 (input element) of the second planetary reduction gear 5 are overlapping.

The power transmission device 1 of the present embodiment has the following configuration.

(6) The body case 9 (one example of a case member) has the wall part 142 between the first planetary reduction gear 4 and the second planetary reduction gear 5.

The bearing B3 (bearing) is arranged at the inner circumference of the wall part 142.

The cylindrical part 552 which is a portion of the differential case 60 is supported at the inner circumference of the wall part 142 of the intermediate cover 14 with the bearing B3 (bearing) interposed.

By configuring in this way, to emphasize stability of support of the differential case 60, the wall part 142 is purposely arranged between the first planetary reduction gear 4 and the second planetary reduction gear 5, and the cylindrical part 552 which is a portion of the differential case 60 is supported on the inner circumference of the opening 140 of the wall part 142 via the bearing B3. This makes it possible to stably support the differential case 60 while preventing the outer diameter of the bearing B3 that supports the cylindrical part 552 from getting bigger.

The pinion gear 43 (pinion) of the first planetary reduction gear 4 is a stepless pinion gear, and the pinion gear 53 of the second planetary reduction gear 5 is a stepped pinion gear.

In the 1-axis type power transmission device 1, to increase the reduction ratio of the output rotation of the motor 2, it is possible to add a planetary reduction gear (planetary gear mechanism) on the transmission route of the output rotation of the motor 2.

Here, for the pinion gear of the planetary reduction gear, there is the stepped type for which the reduction ratio is easily increased, and the stepless type for which the size is easily made smaller.

If only aiming for the size of the reduction ratio, it is acceptable to have all the planetary reduction gear pinions be stepped types, but in that case, the power transmission device 1 becomes larger in the radial direction. Specifically, there is still the problem of increased size.

Here, the first planetary reduction gear 4 that is positioned to the downstream side of the motor 2 and to the upstream side of the second planetary reduction gear 5 is positioned sandwiched by the motor 2 and the second planetary reduction gear 5, so it is difficult to take space near the first planetary reduction gear 4.

Also, the second planetary reduction gear 5 that is positioned to the downstream side of the first planetary reduction gear 4 and to the upstream side of the differential device 6 is provided between the first planetary reduction gear 4 and the differential case 60 of the differential device 6, so it is easier to take space in the periphery than in the case of the first planetary reduction gear 4.

In light of that, while applying the stepless pinion to the first planetary reduction gear 4 for which it is difficult to take space in the periphery, by applying the stepped pinion to the second planetary reduction gear 5 for which it is comparatively easy to take space in the periphery, in the 1-axis type power transmission device, it is possible to increase the reduction ratio while suppressing an increase in size.

Also, viewing from the radial direction of the rotation axis X, after having the differential case 60 and the stepped pinion gear 53 overlap, using the bearings B2, B3, the configuration has the differential case 60 directly and indirectly supported by the fixed side members (case 13, intermediate cover 14).

This makes it possible to stably support the differential device 6 (differential case 60) while suppressing the length in the rotation axis X direction of the power transmission device 1.

Figure 3:
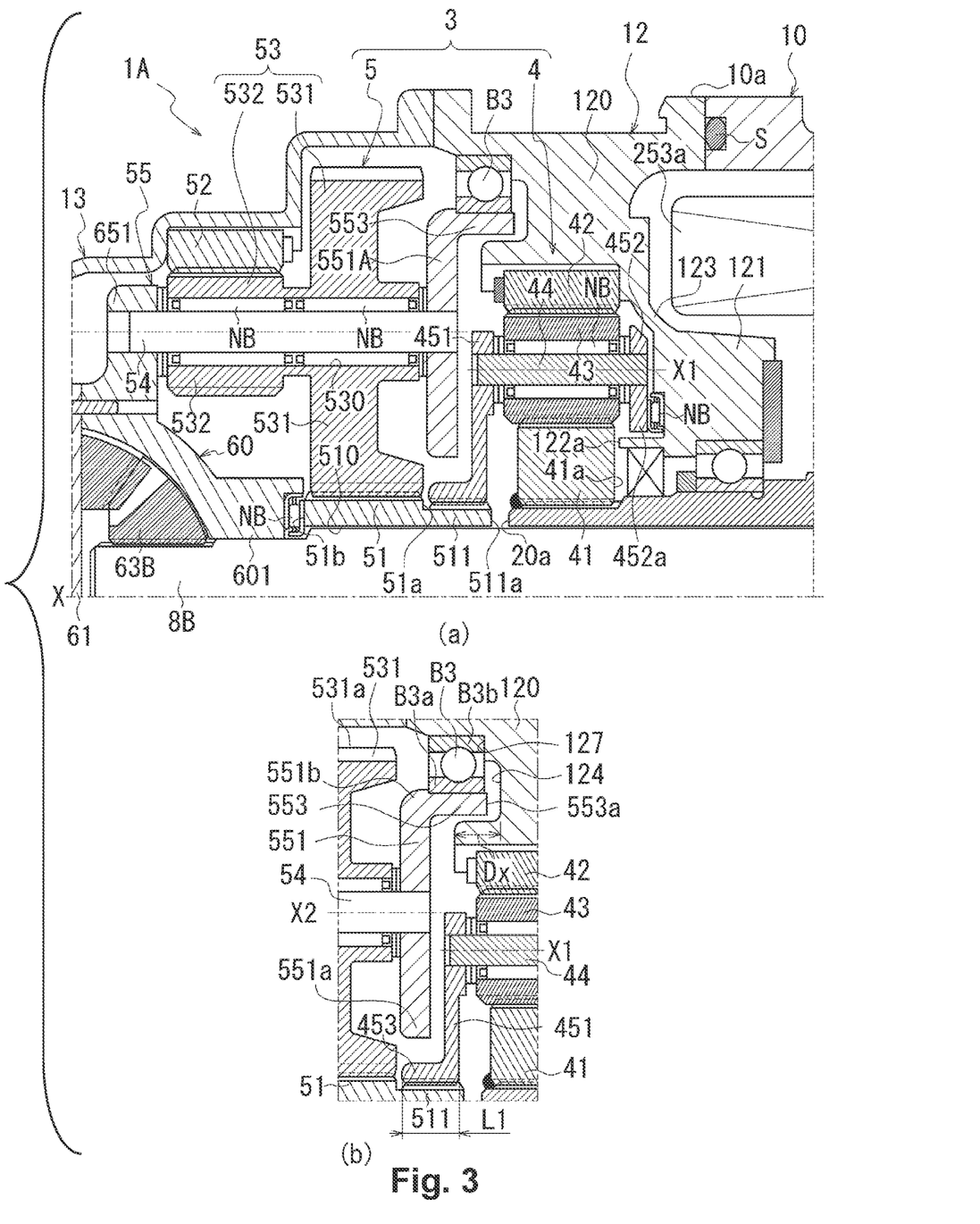
FIG. 3 is an enlarged view around the reduction mechanism of the power transmission device of a modification example.

FIG. 3 (a) is an enlarged view around the reduction mechanism 3 of a power transmission device 1A of a modification example. FIG. 3 (b) is an enlarged view around a side plate 551A of the second planetary reduction gear 5.

The power transmission device 1A of the modification example differs from the power transmission device 1 described above in that it does not have the intermediate cover 14 described above.

With the power transmission device 1A, the side plate 551A of the carrier 55 is supported via the bearing B3 on the inner circumference of the intermediate case 12.

The side plate 551A viewed from the rotation axis X direction is a plate member having a ring shape. The side plate 551A is provided oriented orthogonally with respect to the rotation axis X.

The inner diameter side of the side plate 551A extends to the rotation axis X side along the side plate 451 of the first planetary reduction gear 4 side. An end part 551a of the inner diameter side of the side plate 551A faces the outer circumference of the linking part 453 of the first planetary reduction gear 4 side with a gap being formed in the radial direction.

With the power transmission device 1A of the modification example, the linking part 453 of the first planetary reduction gear 4 side and the linking part 511 of the second planetary reduction gear 5 side are spline fitted at the inner diameter side of the side plate 551A.

The outer diameter side of the side plate 551A is further to the outer diameter side than the ring gear 42 of the first planetary reduction gear 4, and extends to near an outer circumference 531a of the large diameter gear part 531 of the second planetary reduction gear 5.

A cylindrical part 553 extending to the first planetary reduction gear 4 side is provided at the outer diameter side of the side plate 551A.

The cylindrical part 553 is inserted from the rotation axis X direction in a recess 124 provided in the base 120 of the intermediate case 12 side. Inside the recess 124, the cylindrical part 553 is provided avoiding contact with the base 120.

The recess 124 in the base 120 is opened at the second planetary reduction gear 5 side (left side in FIG. 3) at the outer diameter side of the area in which the ring gear 42 of the first planetary reduction gear 4 is spline fitted.

The recess 124 is formed at a depth Dx in the rotation axis X direction that extends to the outer diameter side of the ring gear 42. Viewing from the second planetary reduction gear 5 side in the rotation axis X direction, the recess 124 has a ring shape.

A step 127 that positions the bearing B3 is provided at the outer diameter side of the recess 124.

The bearing B3 is inserted inside the recess 124 from the second planetary reduction gear 5 side, and an outer race B3b is positioned at a position abutting the step 127.

In this state, the bearing B3 is provided with a gap being formed between it and the large diameter gear part 531 of the second planetary reduction gear 5 side.

Furthermore, an inner race B3a of the bearing B3 is provided with a gap being formed in the rotation axis X direction between it and the base 120, and the inner race B3a supports the outer circumference of the cylindrical part 553 of the second planetary reduction gear 5.

For that reason, the cylindrical part 553 of the side plate 551A of the second planetary reduction gear 5 is supported to be able to rotate with the intermediate case 12 which is a fixed side member with the bearing B3 interposed.

The carrier 55 that has the cylindrical part 553 is substantially formed integrally with the differential case 60. The cylindrical part 553 can be thought of as a portion of the differential case 60.

The cylindrical part 553 which is a portion of the differential case 60 is supported by the intermediate case 12 via the bearing B3 between the first planetary reduction gear 4 and the second planetary reduction gear 5 aligned in the rotation axis X direction.

By doing this, the support unit 601 side of the rotation axis X direction of the differential case 60 is indirectly supported by the intermediate case 12.

Thus, the support stability of the differential case 60 when the differential case 60 is rotating around the rotation axis X is increased. Also, by the support stability of the differential case 60 being increased, the stability of the differential device 6 (differential gear) is also increased.

The power transmission device 1A of the modification example is not equipped with the intermediate cover 14 of the power transmission device 1 noted above.

For that reason, a length L1 in the rotation axis X direction of the area in which the linking part 453 of the first planetary reduction gear 4 side, and the linking part 511 of the second planetary reduction gear 5 side are spline fitted is shorter than a length L2 of the area in which the linking part 453 and the linking part 511 of the power transmission device 1 are spline fitted.

Furthermore, the cylindrical part 553 of the second planetary reduction gear 5 side and the bearing B3 supporting the cylindrical part 553 are positioned at the outer diameter side of the first planetary reduction gear 4.

For that reason, a portion (the cylindrical part 553) of the second planetary reduction gear 5, and the first planetary reduction gear 4 overlap in the rotation axis X direction. Specifically, when viewed from radially outward of the rotation axis X, the cylindrical part 553 is provided in a positional relationship to overlap with the first planetary reduction gear 4.

By doing this, the first planetary reduction gear 4 and the second planetary reduction gear 5 are arranged closer than the case of the power transmission device 1 noted above. Thus, it is possible to suppress the size of the power transmission device 1A in the rotation axis X direction.

As described above, the power transmission device 1A of the modification example has the following configuration.

(7) The power transmission device 1A has:

the motor 2, the first planetary reduction gear 4 connected downstream of the motor 2, the second planetary reduction gear 5 connected downstream of the first planetary reduction gear 4, the differential device 6 (differential gear) connected downstream of the second planetary reduction gear 5, and drive shafts 8 (8A, 8B) connected downstream of the differential gear.

The drive shaft 8B is arranged penetrating the inner diameter side of the rotor core 21 of the motor 2 (inner circumference of the rotor), the inner diameter side (inner circumference) of the sun gear 41 of the first planetary reduction gear 4, and the inner diameter side (inner circumference) of the sun gear 51 of the second planetary reduction gear 5.

The differential device 6 has the differential case 60 (differential case).

The cylindrical part 553 of the carrier 55 that is a portion of the differential case 60, and is positioned between the first planetary reduction gear 4 and the second planetary reduction gear 5 aligned in the rotation axis X direction is supported at the inner circumference side of the intermediate case 12 (case member) with the bearing B3 (bearing) interposed.

By configuring in this way, by the cylindrical part 553 of the carrier 55 being supported by the intermediate case 12 via the bearing B3, the support unit 601 side of the differential case 60 in the rotational axis X direction is indirectly supported by the intermediate case 12.

By doing this, the support stability of the differential case 60 when the differential case 60 rotates around the rotation axis X is increased. Also, by the support stability of the differential case 60 being increased, the stability of the differential device 6 (differential gear) is also increased.

The power transmission device 1A of the modification example has the following configuration.

(8) The cylindrical part 553 of the carrier 55 is a portion of the differential case 60 positioned between the first planetary reduction gear 4 and the second planetary reduction gear 5. The cylindrical part 553 of the carrier 55 is supported at the inner circumference side of the intermediate case 12 (case member) with the bearing B3 (bearing) interposed.

By configuring in this way, it is possible to support the cylindrical part 553 which is a portion of the differential case 60 with the inner circumference of the intermediate case 12 which is a fixed side member, without needing the wall part 142 arranged between the first planetary reduction gear 4 and the second planetary reduction gear 5 in the power transmission device 1 noted above.

This makes it possible to omit the intermediate cover 14 having the wall part 142, so it is possible to make the length of the power transmission device 1A in the rotation axis X direction shorter than the power transmission device 1 noted above by the amount omitted for the intermediate cover 14.

The power transmission device 1A of the modification example has the following configuration.

(9) The bearing B3 (bearing) overlaps with the first planetary reduction gear 4 in the radial direction.

When the power transmission device 1A is viewed from the radial direction of the rotation axis X, a portion of the first planetary reduction gear 4 is arranged to be hidden at the rotation axis side (inner diameter side) of the bearing B3.

Specifically, in the rotation axis X direction, the bearing B3 and the first planetary reduction gear 4 are provided having an overlapping range, so the length of the power transmission device 1A in the rotation axis X direction can be shorter by the amount of the overlapping range.

The power transmission device 1A of the modification example has the following configuration.

(10) The bearing B3 (bearing) overlaps the second planetary reduction gear 5 in the rotation axis X direction (axial direction).

By using this kind of configuration, the bearing B3 is provided having a range that overlaps the first planetary reduction gear 4 in the rotation axis X direction, and the bearing B3 is arranged further to the inner diameter side than the outer circumference of the second planetary reduction gear 5 in the radial direction of the rotation axis X.

The bearing B3 is arranged at the outer diameter side of the first planetary reduction gear 4 by using an area of the side of the second planetary reduction gear 5 in the rotation axis X direction. The space inside the power transmission device 1A can be utilized more effectively.

Here, the term "connected downstream" in this specification means being in a connection relationship in which the power is transmitted from the components arranged upstream to the components arranged downstream.

For example, in the case of the first planetary reduction gear 4 connected downstream of the motor 2, this means that the power is transmitted from the motor 2 to the first planetary reduction gear 4.

Also, the term "directly connected" in this specification means that the members are connected with the ability to transmit power to each other without the interposition of another member by which the reduction ratio is converted such as a reduction mechanism, an acceleration mechanism, a shifting mechanism, etc.

Above, embodiments of the invention of the present application were explained, but the invention of the present application is not limited to only the modes shown in these embodiments. Changes can be made as appropriate within the scope of the technical concept of the invention.

The invention claimed is:

1. A power transmission device comprising:

a motor including a rotor;

a first planetary reduction gear connected downstream of the motor, the first planetary reduction gear including a sun gear;

a second planetary reduction gear connected downstream of the first planetary reduction gear, the second planetary reduction gear including a sun gear;

a differential gear connected downstream of the second planetary reduction gear, the differential gear including a differential case;

a drive shaft connected downstream of the differential gear, the drive shaft penetrating an inner circumference of the rotor of the motor, an inner circumference of the sun gear of the first planetary reduction gear, and an inner circumference of the sun gear of the second planetary reduction gear; and a case member in which the first planetary reduction gear, the second planetary reduction gear and the differential gear are arranged, wherein a portion of the differential case positioned between the first planetary reduction gear and the second planetary reduction gear is supported at an inner circumference side of a portion of the case member with a first bearing being interposed, and the first bearing overlaps an engagement portion between an output element of the first planetary reduction gear and an input element of the second planetary reduction gear in a radial direction, the engagement portion being disposed on an inner circumference side of the first bearing.

2. The power transmission device according to claim 1, wherein with the second planetary reduction gear, the sun gear is an input element, a carrier is an output element, and a ring gear is a fixed element, and the differential case is integrally formed with the carrier.

3. The power transmission device according to claim 1, wherein a portion of the differential case positioned at a side opposite to a second planetary reduction gear side is supported on a portion of the case member that houses the differential case with a second bearing being interposed.

4. The power transmission device according to claim 1, wherein the case member has a wall part projecting between the first planetary reduction gear and the second planetary reduction gear, and the first bearing is arranged at an inner circumference of the wall part.

5. The power transmission device according to claim 1, wherein the first planetary reduction gear includes a first linking part, and the second planetary reduction gear includes a second linking part that is linked to the first linking part of the first planetary reduction gear.

6. The power transmission device according to claim 5, wherein a carrier of the second planetary reduction gear includes a cylindrical part positioned radially outward of an engaging part between the first linking part and the second linking part.

7. The power transmission device according to claim 6, wherein a tip of the cylindrical part faces the first planetary reduction gear with a gap being formed therebetween.

8. The power transmission device according to claim 6, wherein the first bearing is arranged on an outer circumference of the cylindrical part.

9. The power transmission device according to claim 1, wherein the differential gear includes bevel gears housed inside the differential case.

10. A power transmission device comprising:
a motor including a rotor;
a first planetary reduction gear connected downstream of the motor, the first planetary reduction gear including a sun gear and a ring gear;
a second planetary reduction gear connected downstream of the first planetary reduction gear, the second planetary reduction gear including a sun gear;
a differential gear connected downstream of the second planetary reduction gear, the differential gear including a differential case;
a drive shaft connected downstream of the differential gear, the drive shaft penetrating an inner circumference of the rotor of the motor, an inner circumference of the sun gear of the first planetary reduction gear, and an inner circumference of the sun gear of the second planetary reduction gear; and a case member in which the first planetary reduction gear, the second planetary reduction gear and the differential gear are arranged, wherein a portion of the differential case positioned between the first planetary reduction gear and the second planetary reduction gear is supported by a portion of the case member at an outer circumference side of the ring gear of the first planetary reduction gear with a first bearing being interposed between the portion of the case member and the portion of the differential case.

11. The power transmission device according to claim 10, wherein The first bearing overlaps the first planetary reduction gear in a radial direction.

12. The power transmission device according to claim 11, wherein The first bearing overlaps the second planetary reduction gear in an axial direction.

13. A power transmission device comprising:
a motor including a rotor;
a first planetary reduction gear connected downstream of the motor, the first planetary reduction gear including a sun gear;
a second planetary reduction gear connected downstream of the first planetary reduction gear, the second planetary reduction gear including a sun gear;
a differential gear connected downstream of the second planetary reduction gear, the differential gear including a differential case;
a drive shaft connected downstream of the differential gear, the drive shaft penetrating an inner circumference of the rotor of the motor, an inner circumference of the sun gear of the first planetary reduction gear, and an inner circumference of the sun gear of the second planetary reduction gear; and
a case member in which the first planetary reduction gear, the second planetary reduction gear and the differential gear are arranged, wherein
a portion of the differential case positioned between the first planetary reduction gear and the second planetary reduction gear is supported at an inner circumference side of a portion of the case member with a first bearing being interposed,
the first planetary reduction gear includes a first linking part,
the second planetary reduction gear includes a second linking part that is linked to the first linking part of the first planetary reduction gear, and
a tip of the first linking part of the first planetary reduction gear faces a side surface of the sun gear of the second planetary reduction gear with a gap being formed therebetween.

14. A power transmission device comprising:
a motor including a rotor;
a first planetary reduction gear connected downstream of the motor, the first planetary reduction gear including a sun gear;
a second planetary reduction gear connected downstream of the first planetary reduction gear, the second planetary reduction gear including a sun gear;
a differential gear connected downstream of the second planetary reduction gear, the differential gear including a differential case;
a drive shaft connected downstream of the differential gear, the drive shaft penetrating an inner circumference of the rotor of the motor, an inner circumference of the sun gear of the first planetary reduction gear, and an inner circumference of the sun gear of the second planetary reduction gear; and a case member in which the first planetary reduction gear, the second planetary reduction gear and the differential gear are arranged, wherein a portion of the differential case positioned between the first planetary reduction gear and the second planetary reduction gear is supported at an inner circumference side of a portion of the case member with a first bearing being interposed, the first planetary reduction gear includes a pinion gear that is a stepless pinion, the second planetary reduction gear includes a pinion gear that is a stepped pinion, and the pinion gear of the second planetary reduction gear is supported by the differential case.

* * * * *